United States Patent [19]

Gillingham

[11] Patent Number: 4,744,444

[45] Date of Patent: May 17, 1988

[54] SHOCK ABSORBER

[75] Inventor: Craig L. Gillingham, 2689 Mataro St., Pasadena, Calif. 91107

[73] Assignee: Craig L. Gillingham, Pasadena, Calif.

[21] Appl. No.: 289,890

[22] Filed: Aug. 4, 1981

Related U.S. Application Data

[63] Continuation of Ser. No. 895,609, Apr. 12, 1978, abandoned.

[51] Int. Cl.$^4$ ............................ F16F 9/34; F16F 9/44
[52] U.S. Cl. ..................................... 188/315; 91/443; 137/523; 137/543.15; 188/322.14; 267/221
[58] Field of Search ..................... 188/321.11, 322.14, 188/284, 318, 316, 299, 300, 315; 267/8 R, 34; 137/523, 543.15; 91/443

[56] References Cited

U.S. PATENT DOCUMENTS

| | | | |
|---|---|---|---|
| 949,833 | 2/1910 | Mueller | 188/321 |
| 1,924,373 | 8/1933 | Peteler | 188/318 X |
| 1,956,383 | 4/1934 | Funston | 188/318 |
| 2,036,623 | 4/1936 | Focht | 188/315 |
| 2,653,682 | 9/1953 | Whisler, Jr. et al. | 188/315 X |
| 2,731,035 | 1/1956 | Stevenson | 137/543.15 X |
| 2,874,955 | 2/1959 | McIntyre et al. | 267/8 R |
| 3,123,347 | 3/1964 | Stormer et al. | 267/127 |
| 3,420,493 | 1/1969 | Kraft | 137/543.15 X |
| 3,603,575 | 9/1971 | Arlasky | 267/34 |
| 3,960,251 | 6/1976 | Johannes | 188/318 X |

FOREIGN PATENT DOCUMENTS

| | | | |
|---|---|---|---|
| 210241 | 7/1956 | Australia | 188/313 |
| 448706 | 8/1927 | Fed. Rep. of Germany | 188/315 |
| 637388 | 10/1936 | Fed. Rep. of Germany | 188/313 |
| 1455903 | 6/1969 | Fed. Rep. of Germany | 188/318 |
| 792868 | 4/1958 | United Kingdom | 188/322.14 |

Primary Examiner—George E. A. Halvosa
Attorney, Agent, or Firm—Ellsworth R. Roston; Charles H. Schwartz

[57] ABSTRACT

An automotive vehicle shock absorber of the type having an alternately compressible and extendible body adapted to coaxial mounting of an oppositely reactive compression spring. The shock absorber comprises a piston rod, a piston carried thereby and an hydraulic fluid containing cylinder, the piston dividing the cylinder into compression and extension chambers for alternately receiving hydraulic fluid. Response characteristics in the compression and extension modes are widely and independently variable. Structure beyond the hydraulic fluid containing cylinder defines first and second passageways communicating by adjustable valving to chambers in the cylinder in differential compression and extension response. The adjustable valving for the extension stroke of the piston is independent of the valving for the compression stroke of the piston and vice versa so that the response characteristics of the shock absorber in the extension stroke are independent of the response characteristics in the compression mode and vice versa. A first member is adjustable from an external position to control the rate of increase of the damping force of the fluid with increased velocities of the piston in the compression stroke of the piston. Second and third members are independently adjustable from external positions to control the response characteristics of the damping force of the fluid with increased velocities of the piston in the extension stroke.

1 Claim, 4 Drawing Sheets

SHOCK ABSORBER

This is a continuation of application Ser. No. 895,609 (now abandoned) filed Apr. 12, 1978.

This invention has to do with vehicle shock absorbers and, more particularly, is concerned with a vehicle shock absorber having widely variable and independently adjustable extension and compression response characteristics.

In a broader sense, the present invention relates to suspension systems of which the novel shock absorbers of the invention are an integral part. Automotive suspensions involve heavy duty springs which act to absorb energy resulting from the momentum of the vehicle in its movement relative to the wheels, which, at least as a first approximation, are traveling along the ground. Upon the encountering of a bump in the road, the automotive spring compresses as the wheel is brought closer to the body by the tendency of the vehicle body to continue to travel in a straight line while the wheel is bumped upward. The energy absorbed by the spring in its compressive response is stored in the spring and is released following removal of the bump impulse so that the wheel is forced downward and the vehicle body forced upward in reaction to encountering the bump. Unless some damping of this energy release is provided, the vehicle body will oscillate and this may cost the driver control of his vehicle. For the purpose of dampening this energy releasing reaction of the spring, a shock absorber is provided. A common type of shock absorber and one on which the present invention is an improvement is one comprising a hydraulically fluid filled cylinder which has a piston working therein displacing the fluid in shock absorbing relation. That is, one end of the shock absorber forms a continuation of the hydraulic fluid filled cylinder and by appropriate connection to the automotive body and wheel structure it moves relative to the piston rod. The spring is generally centered on the shock absorber and acts against the wheel and body through the shock absorber structure. In this manner, upon the encountering of a bump in the road, the spring is compressed but the compression action is damped by the need to displace hydraulic fluid from the compression chamber of the shock absorber, the displacement of fluid damping the response to the bump. Immediately upon passing the bump the spring tends to elongate, drawing the shock absorber to an extended condition. By this time, however, the fluid displaced from the compression chamber has been displaced into the extension chamber and the piston has to move against the extension chamber fluid in order to extend the shock absorber, and in this extension mode, the displacement of fluid from the extension chamber acts to damp the normal spring reaction and the vehicle ride is greatly leveled out.

The problem with existing shock absorbers, particularly in high performance applications for which the present shock absorber is especially well suited, is that while very little control is needed in the compression mode of the shock absorber operation, it is highly desired to be able to better control the extension mode of shock absorber operation, and without having to simultaneously vary the compression mode. Furthermore, it is desired to reduce the damping force of the fluid in the compression stroke of the fluid to as low a value as possible. This has been difficult because each vehicle has had individual characteristics.

While other workers in the art have directed themselves to improve valving systems for controlling the flow of fluid between compression and extension chambers and vice versa, these workers have generally sought to obtain contradictory needs from a common valving system. Accordingly, workers have employed double acting valves passing to the piston as a means of controlling fluid displacement from one chamber to another. The problem is that it is not feasible thereby to control differentially and independently the extension and compression responses but both are adjusted in tandem. In other instances where separate controls have been determined to be desirable, the valving has not been externally adjustable for ease of tailoring the shock absorber settings to the need at hand. Furthermore, proper adjustments in the rate of increase in the damping force of the fluid with increases in the velocity of movement of the piston have not been able to be obtained either in the compression stroke of the piston or the extension stroke of the piston, whether such adjustments have been made externally or internally.

It is accordingly a major object of the present invention to provide a shock absorber of the type displacing hydraulic fluid between compression and extension chambers alternately, which is individually and separately adjustable as to its compression and extension response for wide variation in these response characteristics and vehicle controllability, particularly at very high speed, e.g. 150 miles per hour and above. It is another object to provide a shock absorber in which the response characteristics in the extension stroke of the piston are independent of the response characteristics in the compression stroke of the piston and vice versa. It is another object of the invention to provide a shock absorber which is especially suited for high performance vehicles which is simple in construction and high in reliability. It is another object of this invention to provide a shock absorber of the type described wherein separate valving systems are provided for control of compression-displaced and extension-displaced hydraulic fluids and where each valve system is independent of the operation of the other valve system. Yet another object is to provide a shock absorber design having a minimum efficiency loss or "fading" and a high rate of heat assimilation. It is still another object of the invention to provide means for preventing frothing of hydraulic fluid during transfer between compression and extension chambers. It is still another object of the invention to provide a shock absorber which is length adjustable between its coupling members for ease of mounting in a variety of vehicles and without need for a multiplicity of different length shock absorbers for different vehicle suspension systems. It is still another object of this invention to provide a compression fluid displacement control valve which operates independent of fluid pressure but which is withal overpressure sensitive to prevent rupturing of the shock absorber device. It is yet a further object of the invention to provide an extension displacement fluid flow control valve which is spring loaded for resilient response to fluid pressure but within a predetermined and adjustable range. It is also another object to provide a shock absorber in which the increases in the damping forces of the fluid with progressive increases in the velocity of the piston can be independently controlled from an external position in the compression stroke of the piston and in the extension stroke of the piston.

Other objects of the invention will become apparent hereinafter.

These, and other objects of the invention are realized in an axially compressible and extendible shock absorber for a vehicle adapted to coaxial mounting of an oppositely reactive spring, the shock absorber comprising a piston rod, a piston carried thereby and an hydraulic fluid-containing cylinder, the piston dividing the cylinder into compression and extension chambers for alternately receiving hydraulic fluid. Such fluid is received by the operation of structure disposed beyond said cylinder and defining first and second passageways respectively communicating with the compression and extension chambers in differential compression and extension response determining relation. Features of the present invention in particular embodiments include: the first and second passageways being paraxial with each other and the cylinder along at least a portion of their extent beyond the cylinder; combination of the shock absorber with axially reactive spring means encircling the cylinder in energy storing and returning relation relative to compression and extension operation of the absorber; self-contained fluid means beyond the cylinder, volume responsive to hydraulic fluid pressure to maintain the first passageway hydraulically filled; or, alternatively, where the first passageway tends to be air-containing, provision of dip-tube means extending into the passageway in fluid immersed relation, thereby to block air ingress into the extension chamber and resulting erratic extension response of the shock absorber; provision of first and second one-way valve means respectively in the first and second passageways, each such one-way valve means respectively determining the direction of hydraulic fluid flow through its passageway; first passageway primary valve means controlling the rate of hydraulic fluid flow independently of fluid pressure from the compression chamber in compression response determining relation; secondary first passageway valve means responsive in hydraulic fluid flow rate-increasing relation beyond said primary valve fixed adjustment flow rate to relieve fluid overpressure in the passageway; means for adjustably fixing the first passageway primary valve means within the passageway in fluid flow rate determining relation and freely of secondary valve means response variation; second passageway valve means controlling the rate of hydraulic fluid flow from the extension chamber in extension response determining relation; means adjustably and resiliently biasing the second passageway valve means against hydraulic fluid flow to correspondingly vary the hydraulic fluid pressure in the extension chamber and the extension response of the shock absorber thereby; means adjustably limiting the response of the second passageway valve means in hydraulic fluid pressure-independent relation. Furthermore, these objects are provided by the provision in such a shock absorber of means for producing independent responses of the shock absorber in the extension and compression strokes of the piston and means for providing independent adjustments from an external position in the rate of increase of the damping force of the fluid with increases in the velocity of movement of the piston. Such independent adjustments are obtained in the extension and compression strokes of the piston.

In more particularly preferred embodiments, the extension chamber comprises a cylindrical wall having a piston engaging portion and a continuing portion therebeyond and the shock absorber further includes a fluid outlet port from the extension chamber to the second passageway receiving piston-displaced fluid from both portions in progressively reducing relation responsive to piston travel across the port to progressively increase hydraulic fluid pressure on said piston within said continuing cylinder portion in piston cushioning relation.

Additionally, there is provided coupling means carried by the cylinder and the piston rod respectively for securing the absorber for energy absorption between sprung, e.g. vehicle, and unsprung, e.g. wheel, masses. The piston rod carried coupling means typically may include a shaft thread adjustable relative to the rod for increasing or decreasing the distance between the respective coupling means, and means locking the shaft in its adjustment.

Accordingly, there is provided by the invention in its highly preferred embodiments: a vehicle shock absorber comprising a cylinder containing hydraulic fluid, a first cylinder end closure carrying a vehicle coupling means and a second cylinder end closure, the end closures being adapted to coaxial mounting of an oppositely reactive spring encircling the cylinder in energy storing and returning relation; a piston operating within the cylinder, a piston rod coupled to the piston and a piston rod extension extending through the second cylinder end closure for coupling to a vehicle, the piston dividing the cylinder into a compression chamber adjacent the first cylinder end closure and an extension chamber adjacent the second cylinder end closure; means transferring hydraulic fluid between the compression and extension chambers responsive to piston operation, such transfer means including structure beyond the cylinder defining a first passageway receiving compression-displaced fluid for transfer to the extension chamber, a second passageway receiving extension displaced fluid for transfer to the compression chamber, and valve means alternately opening and closing the passageways to fluid flow in piston movement coordinated relation to determine the shock absorber response to energy absorption and return respectively by the reactive spring. In such embodiments, there may further be provided a compression response determining valve means comprising a first valve chamber formed within the first cylinder end closure as an enlarged continuation of the first passageway, the first valve chamber defining a first valve seat across the first passageway, a first body cooperating with the seat, means to fixedly adjust the valve body relative to the valve seat between predetermined positions, comprising an exteriorly accessible bolt adjustably threaded into the first cylinder end closure and mounting the valve body for axial travel within the valve chamber to and from the valve seat, in compression displaced fluid flow rate controlling relation corresponding to a desired upper and lower compression response; and a second valve chamber also formed within the first cylinder end closure and as an enlarged continuation of the second passageway, the second valve chamber defining a second valve seat across the second passageway, a second valve body cooperating with the second valve seat, means adjustably fixing the maximum unseating of the second valve body including an exteriorly accessible bolt journaling the second valve body within the second valve chamber and carrying a valve body stop means adjustably spaced from the second valve seat by bolt rotation, coaxial compression spring means biasing the second valve into second seat engagement against fluid pressure within the second passageway in resilient flow rate controlling the extension response determining relation within the flow rate limit imposed by the relative adjustment of the second valve body stop means. In such embodiments there may further be provided an internally and externally threaded bolt, internally threadedly supporting the second valve body journaling bolt and externally threadedly engaging the first cylinder end closure for axial movement of the bolts relative to each other and independently of each other relative to the end closure in second valve body spring means axial dimension adjusting relation to vary the spring biasing force and the extension response of the shock absorber thereby. Still further there may be included in the last mentioned embodiment, additional compression spring means, coaxial with the first valve chamber bolt and acting to block first valve body movement away from its adjusted spacing from the first valve seat under normal fluid pressure conditions within the first passageway and to resiliently permit such movement in response to and during abnormal fluid pressure conditions in the first passageway.

The mentioned second valve body typically is a generally cylindrical plug adapted to interfit the second valve seat and is provided with circumferentially distributed flats opposite the surrounding valve seat in hydraulic fluid flow facilitating relation.

In summary form, the more highly particularly preferred embodiments of the invention may be described as embracing a vehicle shock absorber comprising a cylinder containing hydraulic fluid, and a second cylinder end closure, the end closure being adapted to coaxial mounting of an oppositely reactive spring encircling the cylinder in energy storing and returning relation; a piston operating within the cylinder, a piston rod coupled to the piston and having a piston rod extension extending through the second cylinder end closure for coupling to a vehicle, the piston dividing the cylinder into a compression chamber adjacent the first cylinder end closure and an extension chamber adjacent the second cylinder end closure; means transferring hydraulic fluid between the compression and extension chambers responsive to piston operation, the transfer means including a housing structure coaxially surrounding the cylinder supported by the end closures and partially defining a first passageway disposed in the annulus between the housing structure and the cylinder to receive compression displaced fluid for transfer to the extension chamber, a separately defined tube within the housing defining a second passageway extending paraxially through the annulus and receiving extension displaced fluid for transfer to the compression chamber; compression response determining valve means comprising a first valve chamber formed within the first cylinder end closure communicating the compression chamber and extension chamber through the annulus, the first valve chamber defining a first valve seat, an exteriorly accessible first bolt extending through the first valve chamber coaxially with the valve seat therein, a first valve body slidably journaled on the first bolt in adjustably fixed positionable relation responsive to bolt rotation and a coaxial compression spring biasing the first valve body toward the valve seat unyieldingly under normal fluid pressure conditions, extension response determining valve means comprising a second valve chamber formed within the first cylinder end closure parallel to and coplanar with the first valve chamber and communicating the second extension chamber and second passageway tube with the compression chamber, the second valve chamber defining a second valve seat, an exteriorly accessible externally threaded second bolt extending through the second valve chamber coaxially with the second valve seat, an exteriorly accessible internally and externally threaded third bolt threadedly supporting the first bolt within the chamber, a plug-shaped second valve body having a radially enlarged annular shoulder, an axial bore and a counterbore defining recess within such shoulder, the plug valve body being slidably carried on the second bolt, a stop ring fixed to the second bolt in plug valve body recess engagable relation, compression spring means engaged between the third bolt and the plug valve body shoulder resiliently controlling movement of the plug valve body relative to the second valve seat responsive to relative adjustment of the second and the third bolts, and the relative positioning of the stop ring and the plug valve body recess, and check valves blocking counterflow of hydraulic fluid through the first and second passageways responsive to compression or extension operation fluid displacement by the shock absorber, in reactive spring energy storing and returning action damping relation.

It is thus evident that the following advantages obtain in the herein described shock absorber:

Two adjustments for extension damping; a high velocity circuit orifice; a pressure relief or slow velocity circuit;

Supplemental extension damping at extreme limits of stroke;

Wide range compression damping with pressure relief safety;

Isolated external adjustments, one not affecting the other;

Lower unsprung weight on suspension because of possible nontraditional mounting, upside down;

Construction with individual components which can be interchanged or individually replaced, to optimize function in each particular application;

Selective reduction of compression damping to a value lower than almost any other shock by varying the orifice size; compression damping may be reduced to zero because fluid draft through the first passageway as provided is an alternate means to fill the extension chamber;

Constant recirculating of fluid maximizes heat dissipation, reduces viscosity thinning in the hydraulic fluid and minimizes fade, e.g. to less than three percent in a 250° F. environment.

As will be seen from the above discussion, the shock absorber comprising this invention has certain advantages relative to the prior art. For example, the shock absorber provides response characteristics in the compression stroke of the piston independent of the response characteristics in the extension stroke of the piston and vice versa. Furthermore, the response characteristics of the shock absorber in the extension and compression strokes can be independently adjusted. Such adjustments can be independently and easily made from an external position.

As a result, the rate of increase of the damping force of the fluid with increases in the velocity of movement of the piston in the compression stroke of the piston can be independently adjusted from an external position. This is desirable in order to adjust the rate of increase of such damping force to as low a value as possible while still obtaining an effective operation of the shock absorber. Furthermore, provision is made in the shock absorber for preventing the shock absorber from being subjected to excessive fluid pressures in the compression stroke of the piston.

Similarly, adjustments can be provided from an external position in the rate of increase of the damping force with increases in the velocity of movement of the piston in the extension stroke. One adjustment can be provided to adjust the rate of increase of the damping force to relatively high values for low velocities of piston movement. Another adjustment can be provided to provide a substantially linear relationship between the damping force of the fluid and the velocity of movement of the piston, such adjustment being made to control the slope of the linear curve. The two adjustments may be made on an interrelated basis to provide, for low velocities of movement of the piston, high rates of increase in the damping force with increases in the piston velocity and to provide the linear relationship between the damping force and the piston velocity for increased piston velocities.

The shock absorber of this invention also provides other advantages relative to the prior art. For example, the shock absorber includes a first conduit for transferring fluid from the extension chamber to the compression chamber in the extension stroke of the piston and second conduit for transferring fluid from the compression chamber to the extension chamber in the compression stroke of the piston.

The provision of separate conduits is advantageous because it facilitates an independent operation of the shock absorber in the compression and extension strokes of the piston. This is particularly true in the shock absorber of this invention because a first valve is associated with the first conduit to control the passage of fluid through the first conduit and a second valve is associated with the second conduit to control the passage of fluid through the second conduit, the operation of the first and second valves being independent of each other. Preferably the first and second conduits are disposed in nested relationship to each other to conserve space. The first and second conduits are also preferably paraxial with the compression and extension chambers.

The shock absorber of this invention also includes other advantages over the prior art. For example, the movement of the piston is cushioned near the end of the extension stroke to prevent the piston from bottoming out against the cylinder walls. Furthermore, provision is made for adjusting the over-all length of the shock absorber without affecting the response characteristics of the shock chamber so that the shock absorber can be adapted to fit and operate satisfactorily in individual vehicles.

The present apparatus will be further described as to an illustrative embodiment thereof in conjunction with the attached drawings in which:

FIG. 3 is a view in transverse section through the first cylinder end closure taken along line 3—3 in FIG. 2 and showing the control valve arrangement during extension mode operation of the shock absorber;

FIG. 3a is a view like FIG. 3 showing the control valve arrangement during compression mode operation of the shock absorber;

FIG. 4 is a fragmentary detailed view of the one-way valve in the compression chamber taken on line 4 in FIG. 3;

FIG. 4a is a view like FIG. 4 of the same one-way valve taken on line 4a in FIG. 3a;

FIG. 5 is a fragmentary view of the extension control valve plug taken on line 5—5 in FIG. 3a;

It will be apparent from the foregoing that the invention apparatus provides a shock absorber of maximum versatility. Not only is the compression response characteristic widely variable, down to virtually no resistance to compression by the simple expedient of a bolt adjustment to narrow or widen the flow path through the compression response valve, but the extension response characteristic is similarly and independently separately adjustable through a wide range of resistance settings by the likewise simple expedient of another bolt adjustment; these bolt adjustments are readily made from outside the shock absorber, indeed while the shock absorber is on the vehicle.

Beyond their simple ease of adjustment, the compression and extension response controlling valves are each separately variably spring tensioned; in the case of the compression valve, to ensure against rupturing overpressure caused by too tight a setting of the fixed valve, and in the case of the extension valve, to enable variably resilient back-pressuring of the extension chamber thereby to determine extension response, within a limit imposed by a stop ring which is itself adjustable.

The extremely versatile response characteristics derive from placing the compression and extension response controlling valves in an accessible location, beyond the cylinder end, and providing the fluid transfer also beyond the cylinder, i.e. alongside the cylinder, rather than through the piston itself, piston valves being exteriorly inaccessible so that the shock absorber needs to be torn down to make any needed, or desired adjustment.

Figure 1:
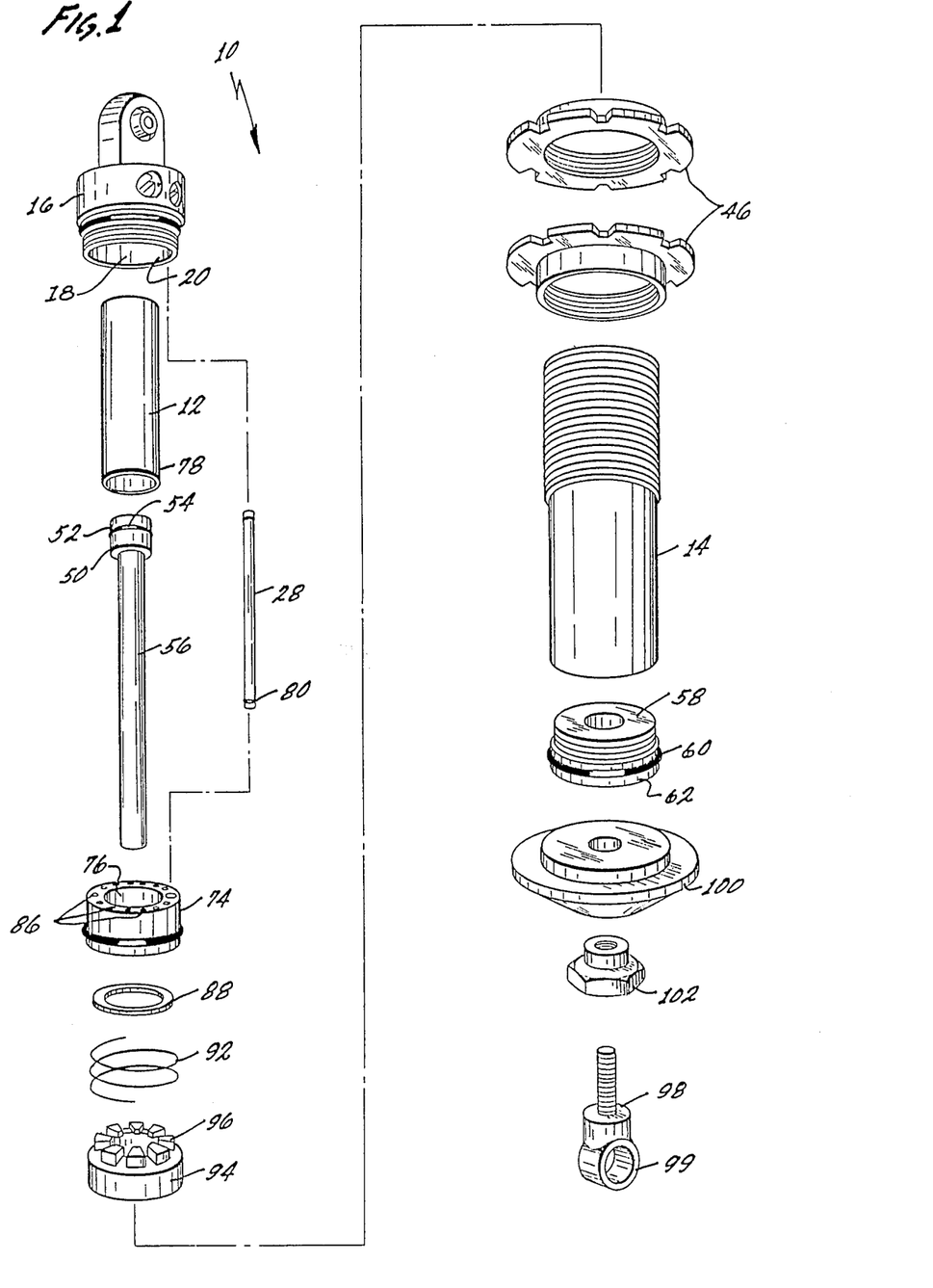
FIG. 1 is an exploded view of the external portions generally of the shock absorber according to the invention.
Figures 2, 6, 7:
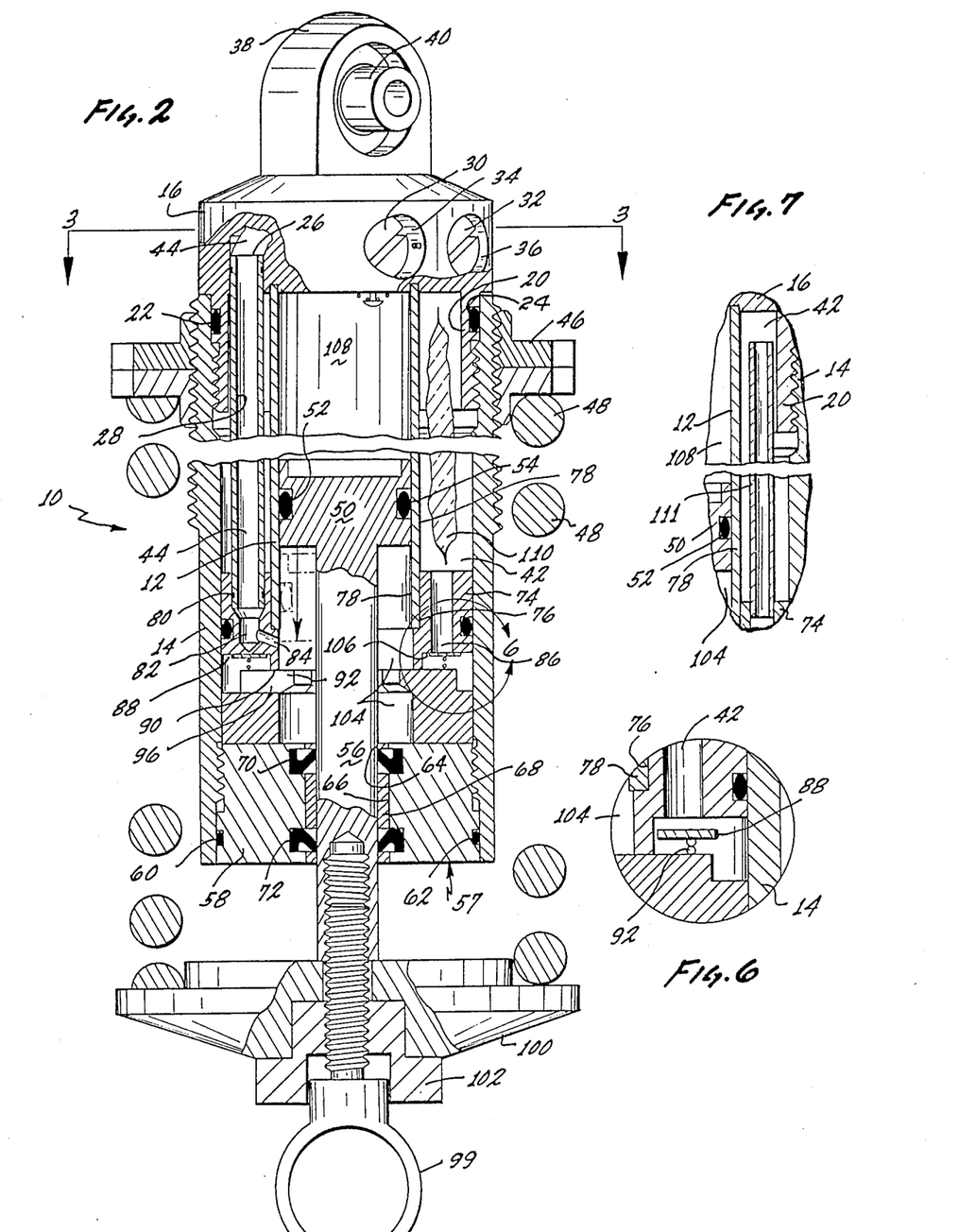
FIG. 2 is a view of the shock absorber generally in vertical section.
FIG. 6 is an enlarged fragmentary view of the portion of the valve within the circle 6 in FIG. 2 and and shows the one-way extension mode valve.
FIG. 7 is a fragmentary view of a dip tube embodiment of the invention.

With these features in mind we turn to the drawings in detail. FIGS. 1 and 2 show the present shock absorber 10 in exploded and assembled condition respectively. In reference first then to these two Figures, the shock absorber 10 includes a working cylinder 12 adapted to contain hydraulic fluid (not shown), a cylindrical housing 14 of greater diameter than the working cylinder and coaxial therewith externally and internally threaded at its upper end (in the Figure, although in use the shock absorber can be mounted with either end up) and internally threaded at its lower end. A first cylinder end closure 16 is provided having an annular recess 18 into which the working cylinder 12 is fitted and an externally threaded boss 20 beyond the recess onto which is threaded the housing 14. An O-ring seal 22 in groove 24 fluid tightly seals the housing 14 to the end closure boss 20. First cylinder end closure 16 further includes an extension chamber fluid inlet port 26 which fluid tightly receives fluid transfer tube 28 and valve assemblies adjustable by adjustment bolts 30, 32 in holes 34, 36 which are to be described hereinafter in conjunction with FIG. 4 and FIG. 4a particularly. First cylinder end closure 16 is surmounted by a vehicle coupling boss 38 including a ball bearing mounted bushing 40 of conventional design.

FIG. 1 depicts the paraxial relationship of the cylinder 12, the housing 14 and the transfer tube 28 which extends through the annulus 42 defined by the housing and cylinder, forming therein one portion of a separate "second" passageway or conduit 44 (for extension operation displaced fluid as will be hereinafter described). Although the first passageway and the second passageway 44 are preferably in nested relationship to conserve space, it will be appreciated that the passageway or conduits can be disposed in displaced relationship. Furthermore, the passageways or conduits do not have to be disposed in paraxial relationship to the extension and compression chamber in the cylinder 14 although it is preferable that such a relationship be provided to facilitate the flow of fluid between the chambers.

A bifurcated flange 46 is threaded onto the housing for engaging one end of the conventional oppositely reactive compression spring 48, the operation of which the shock absorber 10 is intended to modify.

A piston 50 is slidably mounted within working cylinder 12 sealed therein by O-ring 52 in piston circumferential groove 54, the piston being integrally formed with piston rod 56 which extends along the axis of the working cylinder.

A second cylinder end closure assembly 57 includes end closure element 58 and is threaded into the lower end of housing 14, fluid tightly sealed thereto by O-ring 60 in groove 62. Second cylinder end closure element 58 has an axial bore 64 relieved to define an axial recess 66 into which is press fitted an annular phosphor bronze bearing 68 which journals piston rod 56 for axial movement. Elastomeric seals 70, 72 at opposite ends of the bearing 68 seal the bore 64 against fluid leakage. The second cylinder end closure assembly 57 further includes a cylinder mounting ring 74 having a counterbore 76 into which the lower end 78 of cylinder 12 fits snugly, the mounting ring eccentrically mounting the previously mentioned transfer tube 28 at the tube end remote to the first cylinder end closure 16, sealed there by O-ring 80 and in open communication with passage 82 and port 84 formed in the mounting ring 74.

The mounting ring 74 is further provided with a perimetrical series of paraxial passages 86 formed as a portion of the compression fluid transfer "first" passageway (including the tube 28) to be described hereinafter. A one-way valve across the passages 86 is provided in the form of valve ring 88 which is guided by annular boss 90 formed on the mounting ring 74 in movement (up and down in the drawing) into passages 86 opening (see FIG. 6) or closing (FIG. 4) position urged by compression spring 92 and responsive to fluid pressure in the passages 86 and thus in annulus 42.

A blocking ring 94 having a circular series of radially aligned fluid passing flanges 96 completes the end closure assembly 57 and secures the mounting ring 74 to the working cylinder end 78 responsive to inward threading of the end closure element 58, and supports compression spring 92 biasing valve ring 88 into closed position.

A piston rod extension 98 carrying a conventional vehicle coupling eye 99 is threaded into the other end of piston rod 56 to extend generally beyond the second cylinder end closure element 58. A circular flange member 100 is threaded onto piston rod extension 98 and engages the end of the oppositely reactive compression spring 48, opposite flange 46, the distance between flange member 100 and flange 46 defining the axial extension of and therefore the degree of compression of spring 48.

An important feature of the present shock absorber is the ability to vary the overall axial length of the absorber without changing the degree of compression of the reactive spring 48 or the response characteristics of the shock absorber. This feature is realized by enabling threaded adjustment of the piston rod extension 98 relative to the piston rod 56, and the provision of a lock nut 102 also threaded onto piston rod extension 98 and rotatable relative to the flange member 100 whereby the rod and rod extension can be extended in overall length without changing the relative spacing of the flange member 100 and flange 46 and thus leaving the spring 48 unchanged in compression, so as not to vary the predetermined spring response, or require a new different spring.

With the shock absorber 10 thus far described it will be apparent that the device is an alternately extendible and compressible shock absorber in which piston 50 works against hydraulic fluid to damp the reaction of spring 48 to impulsive forces of compression and extension such as are generated by encountered road bumps.

The apparatus departs from the conventional shock absorbers in its transport paths for, and valving of, the displaced hydraulic fluid. Thus again with reference to FIG. 2 where the shock absorber 10 is shown proceeding through an extension stroke (the piston 52 is moving downward away from the first cylinder end closure 16) responsive to energy return by the compression spring 48, it is evident that fluid below the piston 50 occupies one portion of the cylinder 12, which will be referred to as the extension chamber 104, and that this chamber is being axially reduced, effecting a forcing out of fluid from the extension chamber. This fluid cannot pass through passages 86 because the fluid pressure and spring 92 acting on valve ring 88 act to close this one-way valve. Port 84 formed in mounting ring 74 just beyond the wall of cylinder 12, however, is open at this time and the piston 50 accordingly displaces fluid into the port 84, through passage 82 and up transfer tube 28 toward first cylinder end closure 16.

Before proceeding further to trace the fluid thus displaced, attention is drawn to the placement of port 84 relative to the stroke (range) of piston 50, the stroke range limit being indicated by phantom line 106. It will be seen that the piston 50 partially covers the port 84 opening at its maximum stroke length. The result of this relative positioning of the port 84 and piston 50 is that the port is proportionately reduced in size and the fluid beyond the piston is progressively trapped in place, increasing in pressure as the piston continues to advance and thereby serving to cushion the piston stroke and prevent bottoming out of the piston. Absence of full piston 50 closure of the port 84 ensures some movement in the trapped fluid and prevents jarring of the piston against the fluid or against the walls of the extension chamber.

Returning to the fluid transport, and ignoring for a moment the specific and novel valve assemblies within first cylinder end closure 16, it is evident that the extension stroke discharged fluid is transferred to the cylinder 12 portion above the piston, which is herein referred to as the compression chamber 108, only to be displaced therefrom by the piston 50 on the compression stroke of the piston into the annulus 42 and from there into the extension chamber 104.

Figures 3, 3A, 4, 4A, 5:
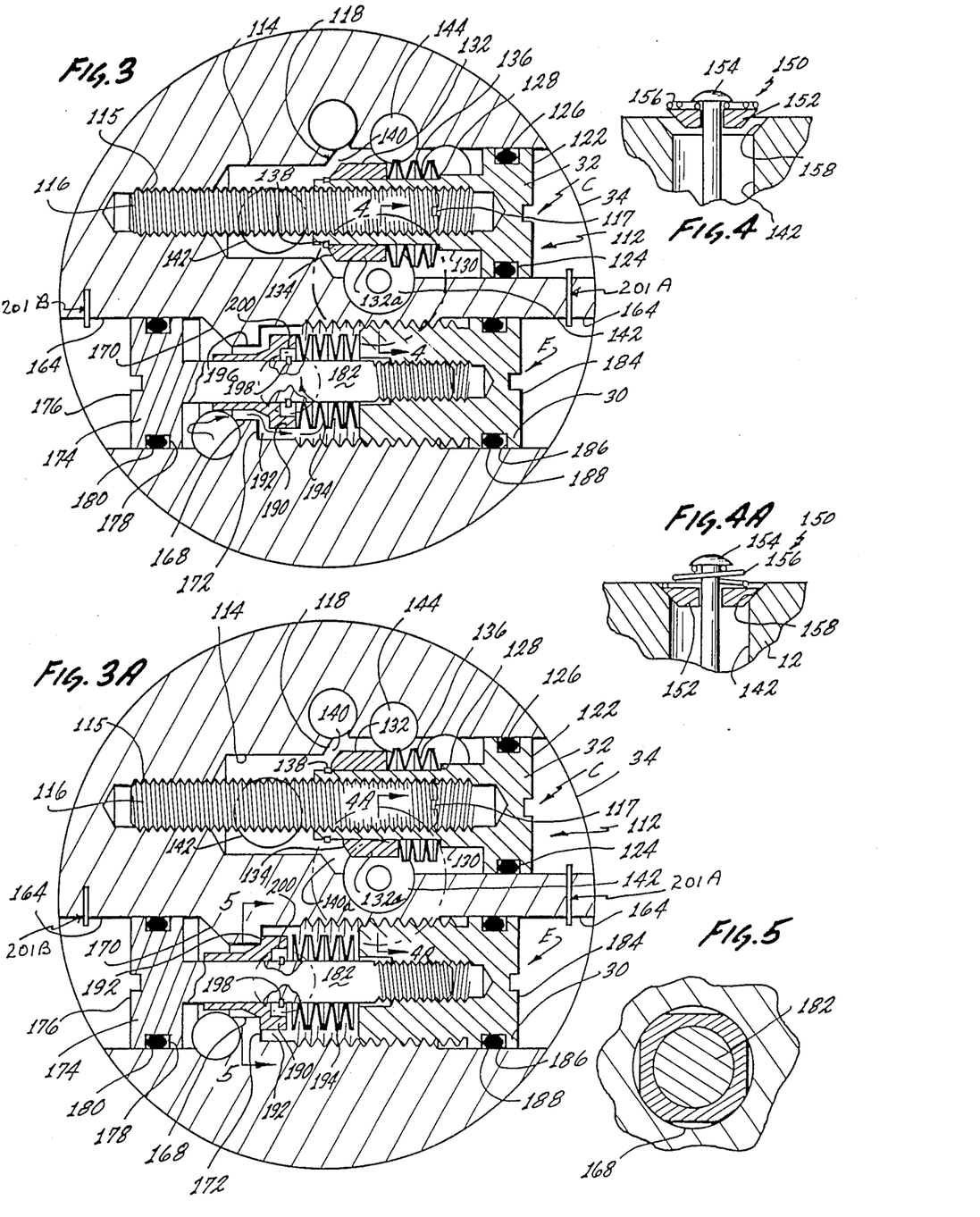

A second one-way valve is provided against fluid counterflow on the compression stroke, see FIGS. 4 and 4a, and the ensuing description. By providing separate one-way valves and ensuring that one of the valves is closed in the extension of the piston and the other valve is closed in the compression stroke of the piston, independent responses of the shock absorber in the compression stroke and in the extension stroke are facilitated. The provision of such one-way valves also assures that the response characteristics of the shock absorber in the extension and compression strokes of the piston can be independently adjusted.

In preferred embodiments of the invention, a self-contained fluid-filled pressure collapsible body 110 is provided within annulus 42 for the purpose of expanding and contracting responsive to hydraulic fluid pressure within the annulus 42 so as to maintain an apparently hydraulically fluid-filled condition in the annulus. The compression chamber 108 will hold more hydraulic fluid than the extension chamber 104 because the piston rod 56 occupies some volume in the extension chamber. It is thus necessary to offset this fluid capacity difference. The separately formed body 110, which expands when the compression chamber 108 is full and contracts when the extension chamber 104 is full, serves this need, blocking air from the passageway annulus 42 and preventing frothing and erratic performance. Bags of the type contemplated are filled with a readily compressible vapor such as a Freon material. See U.S. Pat. No. 3,123,347 issued Mar. 3, 1964 to Stromer et al which is hereby incorporated by reference for further particulars on bags useful herein.

As an alternative to the self-contained volume compensating body of FIG. 2, just described, the frothing of hydraulic fluid which accompanies the presence of air in the first passageway can be minimized by providing, with the shock absorber inverted from the position shown in FIG. 2, a dip tube through the passageway annulus 42 to be end-immersed in the hydraulic fluid at all times and leading to extension chamber 104. Thus, now with reference to FIG. 7 wherein like parts to the other Figures bear like numbers and wherein the shock absorber is inverted from the position shown in FIG. 2, a dip tube 111 extends downwardly through the annulus 42 blocking chance air entrainment in the fluid despite the volume differences between extension and compression chambers when the hydraulic fluid is in the effectively larger compression chamber, so that annulus 42 is at least partly empty. The length of tube 111 relative to fluid present is such that it will always be end immersed in hydraulic fluid, while the shock absorber is proper end up.

The dip tube described in the previous paragraph is disposed in the annulus 42 when the shock absorber is inverted from the position shown in FIG. 2. When the shock absorber is in the position shown in FIG. 2, a plurality of dip tubes may be used and each dip tube may be disposed in a different one of the passages 144 in FIGS. 3 and 3a.

Turning now to the previously mentioned valve assemblies which by virtue of their widely and independently variable setting provide relative compression and extension versatility not heretofore available, the compression and extension valve assemblies C and E respectively are shown in FIG. 3 at their position for extension mode and in FIG. 3a for compression mode operation.

Structurally the valve assembly C comprises first a compression valve 112 housed in axially stepped horizontal bore 114 formed in first cylinder end closure 16 and with a tapped inner terminus 115 into which a bore coaxial bolt shank 116 is fixed by rotation by the slotted end 117 thereof. Approximately midway along the length of bolt shank 116 the bore 114 is radially enlarged to define annular valve seat 118. Bolt head 32 is threaded onto the shank 116 through hole 34 where the bore 114 meets the outer wall of the first cylinder end closure 16. Bolt head 32 is formed with a slotted outer end portion 122 having a circumferential sealing groove 124 and O-ring seal 126 therein in sealing engagement with the bore 114. Formed inwardly of the outer end portion 122 is an annular bolt shoulder 128 and a barrel 130 therebeyond. A valve body 132 is journaled on the bolt 130 for rotational or longitudinal motion, the valve body having a face 134 generally congruent with the valve seat 118 thereopposite. A compression spring 136 suitable of the Belleville type is mounted coaxially onto the bolt barrel 130 between the valve body 132 and the bolt shoulder 128, to resiliently urge the valve body toward but not necessarily into contact with the valve seat 118.

A stop 138 is carried on the bolt barrel 130 forwardly of the valve body 132 to block spring 136 against forward movement of the valve body. Upon rotation of the bolt head 32 relative to the bolt shank 116 the valve body 132 is carried closer or farther away from the valve seat 118 correspondingly to vary the gap 140 between the valve body and seat. At shown in FIG. 3a, a compression chamber outlet port 142 is provided in the first cylinder end portion 16 communicating the compression chamber 108 with one side of the valve gap 140 within the bore 114, to receive fluid being displaced from the compression chamber by piston 50 on shock absorber axial compression. On the other side of the valve gap 140 a series of passages 144 are provided through the first cylinder end closure 16 communicating the bore 114 with the annulus 42 between the housing 14 and the working cylinder 12. The size of gap 140 thus controls fluid flow rate between the compression chamber outlet port 142 and the "first" fluid passageway beyond the valve body 132 including passages 144. The valve assembly C is fluid pressure independent in its setting by rotation of the bolt head 32 relative to the bolt shank 116.

An overpressure fluid relief feature is in compression valve assembly C, however, in the event of abnormal compression fluid pressures. Thus, although Belleville spring 136 cannot close the valve gap 140 beyond the setting of stop 138 in the event of overpressures in the fluid beyond the spring 136 biasing force (sufficient against all but abnormal pressures), such overpressures will temporarily widen the gap 140 to relieve the fluid pressure. See numerals 132a and 140a in FIG. 3a. As will be seen in FIG. 3a the valve body is shown, at the upper portion of the assembly C, in one position at 132 relative to define the gap 140 and is shown, at the lower portion of the assembly C, in a position 132a to define a widened gap 140a.

The amount of force exerted by spring 136 is constant, regardless of the position of the valve body 132 relative to the valve seat 118. Thus, the valve gap 140 can be varied by rotation of the bolt shank 116 to set different operation conditions, e.g. between where virtually no compression resistance (large spacing for gap 140) is desired to extreme compression resistance, while all the while having a predictable overpressure relief setting.

During the compression mode just described, the one-way valve generally indicated at 150, best shown in FIG. 4a, comprises valve disc 152 carried on headed valve pin 154 under downward urging of compression spring 156, is closed against congruent wall 158 of the cylinder 12.

In the extension mode, the one-way valve 150 is opened against the force of spring 156 by fluid being in compression chamber inlet 142, which fluid has been displaced from the extension chamber 104, through transfer tube 28 and into the first cylinder end closure 16 at 44. Therein the extension displaced fluid is passed into extension valve assembly E, the bore 164 thereof formed in the closure 16 typically being parallel to and in the same plane as the compression valve assembly C bore 114. Bore 164, like bore 114, extends chordally through the closure 16 in the closure outer wall and defines therewithin a double shoulder 168 having a sloped surface 170 and a radially disposed surface 172.

The extension valve assembly E comprises a first bolt 174 having a head 176 provided with a circumferential sealing groove 178 with an O-ring seal 180 therein sealing the bolt to the bore 164 against leakage of fluid. The bolt also has a shank 182 extending coaxially with the bore 164. A second bolt 30 having slotted bolt head 184 is threaded onto the first bolt shank 182 from the opposite end of the bore 164. The second bolt head 184 is similarly provided with a circumferential sealing groove 186 and an O-ring 188 therein sealing the bolt head 184 to the bore 164 against fluid leakage. Second bolt 30 is internally and externally threaded to be independently thread-adjustable relative to the bore 164, and with or to the first bolt 174. Preferably the internal and external threading of the bolt 30 is identical to facilitate independently, and get proper adjustments of the bolts 30 and 174.

A plug-shaped extension valve body 190 conveniently formed with flow facilitating flats 192 is journaled on the first bolt shank 182 for sliding movement relative to the bore radial surface 172 which forms thereby a valve seat. A compression spring 194 also suitably of the Belleville type is carried coaxially on the first bolt shank 182 axially compressed more or less by adjustment of the second bolt 30 relative to the first bolt 174. Typically the extension valve body 190 is employed with bore valve seat radial surface 172 under resilient pressure from spring 194. Upon displacement of fluid from the extension chamber 104, the fluid enters the bore 164 through transfer tube 28, is funneled toward annular gap 196 by bore surface 170, and upon reaching a sufficient pressure to overcome the spring 194 (which spring setting thus first determines the extension response characteristic of the shock absorber) the valve body 190 moves off surface 172. Fluid then flows into the compression chamber 108 through a port 200 which extends into the compression chamber. At the same time, the valve 150 opens and fluid flows into the extension chamber through the port 142 from the reservoir.

Spring responsive movement of valve body 190 is not unrestricted. In addition to the spring 194 already mentioned, stop 198 is carried within a recess disposed directly below the port 200 formed on the valve body 190.

The recess is cut into the valve 190. This stop limits travel of the valve body 190 from the valve seat surface 172 regardless of spring compressing force of fluid; thus the maximum rate of fluid flow is controlled, determining the maximum extension response as well as the initial response set by the spring pressure adjustment.

As a signal feature of the invention, the exterior response characteristic can be varied from a position outside the shock absorber by increasing or decreasing the axial length of the spring 194 by approximately screwing the second bolt 30 more or less onto the first bolt shank 182; this will determine the initial response pressure for a given spring 194. The response characteristics of the extension valve assembly E can also be varied by adjusting the position of the stop 198 relative to the valve seat surface 172 (by rotation of first bolt 174 in second bolt 130). Such adjustment in the position of the stop 198 will correspondingly limit the travel of the valve body 190 and thus fix the maximum response on extension fluid development.

Pins 201A and 201B may be provided to maintain in assembled relationship the valve arrangements shown in FIGS. 3 and 3a and described above. The pins 201A and 201B are removable to provide for an assembly or disassembly of such valve arrangements.

It is accordingly possible with the shock absorber 10 as described to independently individually and separately vary absolutely and relative to each other the compression and extension response of the device. The versatility of response thus provided is graphically depicted in FIGS. 8 and 9 wherein the extension and compressive damping forces for different magnitudes of impulse velocity are respectively presented.

Figure 8:
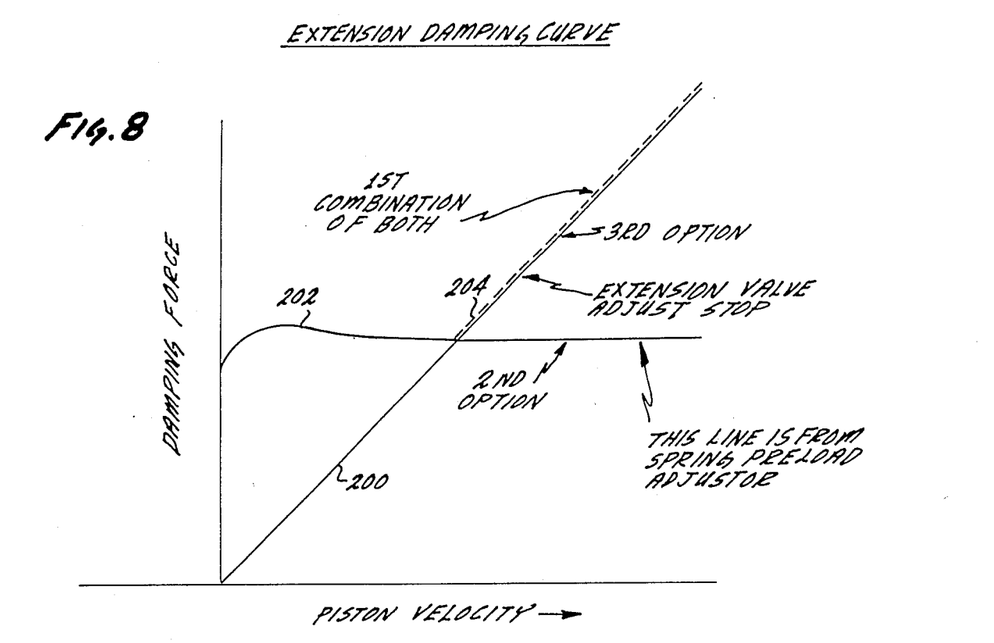
FIG. 8 is a graphical depiction of the extension response characteristics of the invention shock absorber.

Thus, with reference to FIG. 8, a solid line curve 202 traces the damping attributable to the setting of the preload spring 194 in the extension valve assembly E. If there were no further adjustment provided in the shock absorber, the curve 202 would rise nonlinearly at first, and would relatively quickly flatten, producing no further increase in damping force regardless of impulse velocity.

Alternatively, the stop 198 in the extension valve assembly may be set at some relative position and this will cause the damping force to be directly proportional to the impulse velocity. The straight-line relationship is shown in solid lines in FIG. 8 as curve 200, providing damping which is quite stiff through the response curve.

A still further alternative to the present extension valve assembly is provided for a nonlinear response in lower impulse velocity regimes and a linear response (not leveling) beyond the lower velocity regimes. This curve is shown in FIG. 8 at 204 as a series of dashes and represents the damping result obtained by blocking more than some predetermined amount of spring 194 compression with stop 198. Of course, the proportion of response engendered by the spring 194 and the stop 198 can be varied by adjustments of the spring and the stop between the extreme cases, and from outside the absorber, even on the vehicle, e.g. between race runs.

The composite curve 204 provides certain advantages over each of the individual curves 200 and 202. Actually, the curve 200 might be preferred because it provides an essentially linear response. However, the amount of damping force provided by the curve 200 for low fluid velocities may not be sufficient. By combining the response of the curve 202 for low fluid velocities with the response of the curve 200 for increased fluid velocities, any disadvantages of the curve 202 in providing low forces of fluid damping at low fluid velocities are minimized.

Figure 9:
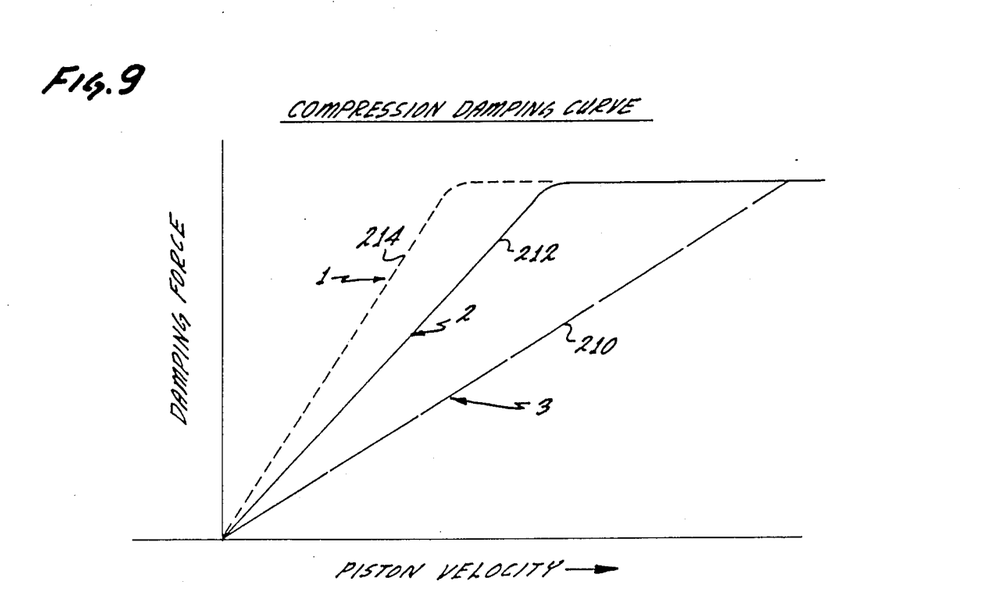
FIG. 9 is a graphical depiction of the compression response characteristics of the invention shock absorber.

Turning to FIG. 9, still more versatility is evident since the compression response characteristic can be itself widely varied, and completely independent of whatever setting has been selected for the extension response. The rate of increases in the damping force of the fluid with increases in the velocity of the fluid can be varied by adjustments in the setting of the bolt 32. This will be seen by the curves 210, 212 and 214 which are obtained for different settings of the bolt 32. Such rate can be varied between a rate approaching zero and a rate approaching infinity in accordance with the setting of the bolt 32. As the gap 140 is decreased in width, progressively stiffened response is provided to increase the slope of the response curve in the direction of the curve 214.

Preferably the rate of increase of the damping force with increases in piston velocity is set as low as possible for any particular vehicle. However, the rate of increase of such damping force may be different for different vehicles. The bolt is accordingly adjusted to provide an optimum damping in the movements of the piston in the compression stroke. Furthermore, the knee of the curves 210, 212 and 214 is at approximately the same level of damping force. This represents the action of the Belleville spring 136 to overpressure conditions relative to its presetting.

As previously described, the response characteristics of the shock absorber of this invention in the compression stroke of the piston are independent of the response characteristics of the shock absorber in the extension stroke of the piston and vice versa. This may be seen from the response characteristics of FIGS. 8 and 9. Thus, any adjustment in the setting of the bolt 32 to adjust the response characteristics of the shock absorber in the compression stroke of the piston does not affect the operation of the shock absorber in the extension stroke of the piston. Similarly, any adjustment in the setting of the bolt 30 or the bolt 174 does not affect the operation of the shock absorber in the compression stroke of the piston. Actually, even the settings of the bolts 30 and 174 are independent of each other, as may be seen from FIG. 8.

Although this application has been disclosed and illustrated with reference to particular applications, the principles involved are susceptible of numerous other applications which will be apparent to persons skilled in the art. The invention is, therefore, to be limited only as indicated by the scope of the appended claims.

I claim:

1. A vehicle shock absorber comprising a cylinder containing hydraulic fluid, a first cylinder end closure carrying vehicle coupling means, and a second cylinder end closure, said end closures being adapted to coaxial mounting of an oppositely reactive spring encircling said cylinder in energy storing and returning relation; a pistion operating within said cylinder, a piston rod coupled to said piston and having a piston rod extension extending through said second cylinder end closure and carrying further means for coupling to a vehicle, said pistion dividing said cylinder into a compression chamber adjacent said first cylinder end closure and an extension chamber adjacent said second cylinder end closure; means transferring hydraulic fluid between said compression and extension chambers responsive to piston operation, said transfer means including a housing structure coaxially surrounding said cylinder supported by said end closures and partially defining a first passageway in the annulus between the housing structure and the cylinder for receiving compression displaced fluid for transfer to said extension chamber, a separately defined tube within said housing defining a second passageway extending paraxially through said annulus and receiving extension displaced fluid for transfer to said compression chamber; compression response determining valve means comprising a first valve chamber formed within said first cylinder end closure communicating said compression chamber and extension chamber through said annulus, said first valve chamber defining a first valve seat, an exteriorly accessible first bolt extending through said first valve chamber coaxially with said valve seat, a first valve body slidably journaled on said first bolt in adjustably fixed positionable relation responsive to bolt rotation, and a coaxial compression spring biasing said first valve body toward said valve seat unyieldingly under normal fluid pressure conditions; extension response determining valve means comprising a second valve chamber formed within said first cylinder end closure parallel to and coplanar with said first valve chamber communicating said second extension chamber and second passageway tube with said compression chamber, said second valve chamber defining a second valve seat, an exteriorly accessible externally threaded second bolt extending through said second valve chamber coaxially with said valve seat, an exteriorly accessible internally and externally threaded third bolt threadedly supporting said second bolt within the chamber, a plug-shaped second valve body having a radially enlarged annular sholder, an axial bore and a counterbore defining a recess within said shoulder, said second valve body being slidably journaled on said second bolt, a stop ring fixed to said second bolt in second valve body recess engagable relation, compression spring means engaged between said third bolt and said second valve body shoulder resiliently controlling movement of said second valve body relative to said valve seat responsive to relative adjustment of said second and third bolts and the relative positioning of said stop ring and said second valve body recess, and check valves blocking counteerflow of hydraulic fluid through said first and second passageways responsive to compression or extension operation fluid displacement in said shock absorber, in reactive spring energy storing and returning action damping relation.

* * * * *